April 29, 1952 C. MANNAL 2,594,668
FLOWMETER
Filed Jan. 12, 1950

INVENTOR.
Clifford Mannal
BY
Roland A. Anderson
Attorney

Patented Apr. 29, 1952

2,594,668

UNITED STATES PATENT OFFICE 2,594,668

FLOWMETER

Clifford Mannal, Schenectady, N. Y., assignor, by mesne assignments, to the United States of America as represented by the United States Atomic Energy Commission Application January 12, 1950, Serial No. 138,231

3 Claims. (Cl. 73—194)

This invention relates to flow meters and more particularly to meters for measuring small flows of gas. Many devices are known to the art for measuring the flow rate of a gas. Such instruments are not always satisfactory, however, for measuring a very small flow of gas, such as a few cubic centimeters per hour. This range is considerably below that of the typical gas flow meter.

It is an object of the present invention to provide an instrument for accurately measuring small flows of gas. In one form of my invention the gas to be metered is passed through a capillary tube inserted in an electrolyte. A fine wire probe, or electrode, conducting an electric current is provided just flush at or slightly drawn in from the tip of the capillary. When a bubble of gas forms in the tip of the capillary, electrical contact between the electrolyte and the wire probe is interrupted. A second wire in contact with the electrolyte is connected to a suitable counting means so that the number of bubbles or circuit interruptions may be counted. By accurately calibrating the described apparatus, the number of cubic centimeters of gas passing through the container may be readily determined from the number of bubbles formed in a given time. Other objects of my invention will be apparent upon referring to the following specification and drawing, wherein:

Figure 1:
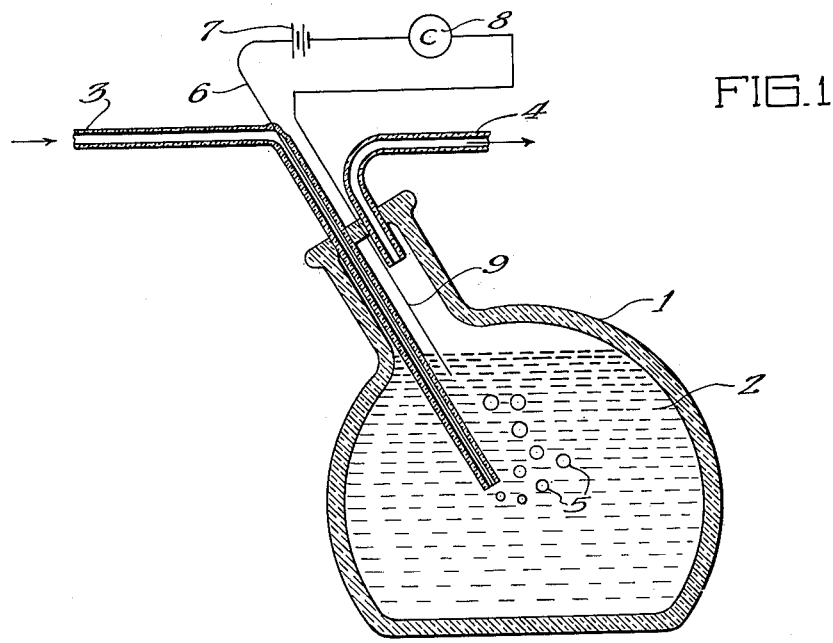
Fig. 1 is a partially diagrammatic view of one example of my invention.

Referring to Figure 1 a container 1 is partially filled with a suitable electrolyte 2, such as 0.1 N nitric acid. The gas to be metered enters through a capillary tube 3 of approximately 60 to 80 mils bore and leaves through a suitable exit tube 4 after having formed bubbles 5 at the tip of tube 3. A fine tungsten wire 6 connected to battery 7 is inserted down the center of the capillary so that its end is just flush with or slightly drawn in from the end of the tube 3. Gas is collected at the end of capillary tube 3 until the buoyancy forces overbalance the surface tension forces tending to hold the bubble on the tube. As each gas bubble 5 is formed, contact is interrupted between wire 6 and electrolyte 2. Since a second wire 9 is also in contact with electrolyte 2, the effect of each bubble is to interrupt the circuit composed of wire 6, electrolyte 2, wire 9, counter 8 and battery 7.

Figure 2:
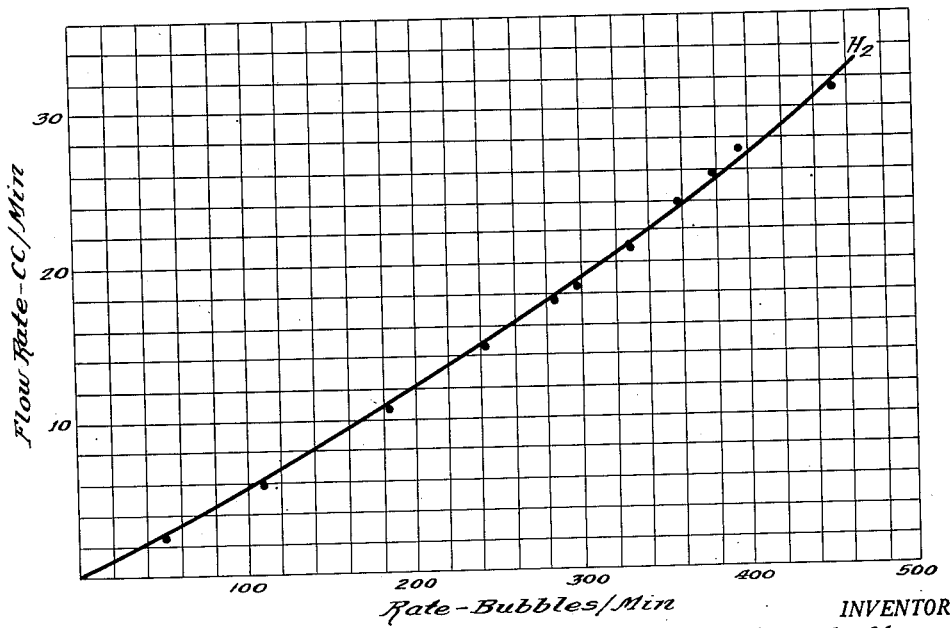
Fig. 2 is a calibration curve plotted from results obtained with the apparatus of Fig. 1.

The size of the bubble formed is to a large extent independent of the rate at which the bubbles are formed. Fig. 2 shows a calibration curve of the above described apparatus wherein the number of cubic centimeters of gas delivered per minute is plotted against the rate of bubbling.

It is to be plainly understood that many modifications and variations may be made in the apparatus disclosed above without departing from the spirit of my invention.

I claim:

1. A flow meter for measuring small gas flows comprising a vessel containing an electrolyte, a gas-inlet capillary tube terminating below the electrolyte level, a fine wire electrode terminating in the capillary opening at the submerged end of said tube, a second electrode in contact with said electrolyte, means for supplying an electric current to the circuit consisting of said electrolyte and said electrodes, and means for counting the number of interruptions in said circuit when a gas flows through said capillary tube.

2. A flow meter for measuring small gas flows comprising a vessel containing an electrolyte, a gas-inlet capillary tube terminating below the electrolyte level, a fine wire electrode extending down the longitudinal axis of said capillary tube to, and terminating at, the submerged end of said tube, a second electrode in contact with said electrolyte, means for supplying an electric current to the circuit consisting of said electrolyte and said electrodes, and means for indicating the number of interruptions in said circuit when a gas flows through said capillary tube.

3. A flow meter for measuring small gas flows comprising a vessel containing an electrolyte, a gas-inlet capillary tube terminating below the electrolyte level, an electrode terminating in the capillary opening at the submerged end of said tube whereby a gas bubble forming in said aperature will interrupt the contact between said electrode and said electrolyte, a second electrode in contact with said electrolyte, means for supplying an electric current to the circuit consisting of said electrolyte and said electrodes, and means for indicating the number of interruptions in said circuit when a gas flows through said capillary tube.

CLIFFORD MANNAL.

REFERENCES CITED

The following references are of record in the file of this patent:

UNITED STATES PATENTS

| Number | Name | Date |
|---|---|---|
| 2,333,791 | Hutchison, Jr. | Nov. 9, 1943 |
| 2,371,995 | Holmes et al. | Mar. 20, 1945 |

FOREIGN PATENTS

| Number | Country | Date |
|---|---|---|
| 556,934 | France | Apr. 24, 1923 |